United States Patent
Paulson et al.

[11] Patent Number: 5,831,541
[45] Date of Patent: Nov. 3, 1998

[54] METHOD AND CIRCUIT FOR DETERMINING IF SEED SENSOR IS OPERABLY CONNECTED TO SEED MONITOR SYSTEM

[75] Inventors: John D. Paulson, West Fargo; Trevor D. Fuss, Fargo; Jeffrey G. Hopman, Fargo; John C. Thomas, Fargo, all of N. Dak.

[73] Assignee: Deere & Company, Moline, Ill.

[21] Appl. No.: 855,625

[22] Filed: May 14, 1997

[51] Int. Cl.$^6$ .................................................. G08B 21/00
[52] U.S. Cl. ...................... 340/684; 340/540; 340/635; 340/661
[58] Field of Search .................... 340/684, 661, 340/635, 540

[56] References Cited

U.S. PATENT DOCUMENTS

| | | | |
|---|---|---|---|
| 4,477,801 | 10/1984 | Robinson, Jr. et al. | 340/684 |
| 5,177,470 | 1/1993 | Repas | 340/684 |
| 5,521,514 | 5/1996 | Nelson et al. | 340/684 |

Primary Examiner—Glen Swann
Attorney, Agent, or Firm—Arnold International; Bruce Y. Arnold

[57] ABSTRACT

A method and circuit for determining whether a sensor 2 is attached to a connection point 5 of a sensor interface circuit 1 of a seed monitoring system. When it is desired to determine whether a sensor is attached to a connection point, the method applies a time varying detection signal at terminal 3 to the connection point 5 via a reactive element, such as capacitor 4. The connection point 5 is connected to a first input of a comparator 9 having its other input set at a first reference voltage which maintains the comparator in a first state in the absence of a detection signal being applied. Even when a detection signal is applied, the comparator is not driven into a second state if an operable sensor is connected to the connection point 5. When the sensor is not connected to the connection point, or is inoperable, the voltage produced by the detection signal at the first input of the comparator is high enough to trip the comparator into a second state, which may be latched. Thus, the interface output 7 following a detection signal provides an indication whether an operable sensor is connected to the seed monitoring system at the connection point 5. In a preferred embodiment, the comparator may be selectively switched to a second reference voltage. In this condition, the interface output 7 is indicative of a seed being sensed by a sensor connected to the connection point 5.

10 Claims, 1 Drawing Sheet

METHOD AND CIRCUIT FOR DETERMINING IF SEED SENSOR IS OPERABLY CONNECTED TO SEED MONITOR SYSTEM

BACKGROUND OF THE INVENTION

In a current seed monitoring system, manually entering which sensors are connected to the system is necessary. Otherwise, an absence of a signal at a particular, optional, sensor location will be interpreted as a blockage of seed flow when, in fact, no sensor is connected at that location. Depending on the number of seed rows being planted, the number of sensors will vary. Also, due to cost considerations, the number of sensors may be less than the number of rows being planted. Thus, currently the equipment operator must needlessly expend time in entering data to the seed monitoring system of the agricultural equipment information as to the pattern of the sensors being used so that false indications of a seed blockage will not occur.

SUMMARY OF THE INVENTION

The object of the invention is to provide a method and apparatus for determining if a sensor is connected to a seed monitoring system so that manual input by the user of the configuration of the sensors of the seed monitoring system is not required. This is accomplished according to the invention by applying a sensor detect signal to a circuit designed to have an output under a first condition which is indicative of an operable sensor being present. In a preferred embodiment, under a second condition, the output of the circuit is indicative of a seed being detected by the sensor. Other objects and further scope of the applicability of the present invention will become apparent from the detailed description given hereinafter. However, it should be understood that the specific example discussed, while indicating a preferred embodiment of the invention, is given by way of illustration only, since various changes and modifications within the spirit and scope of the invention will become apparent to those skilled in the art from this detailed description.

DETAILED DESCRIPTION

Figure 1:
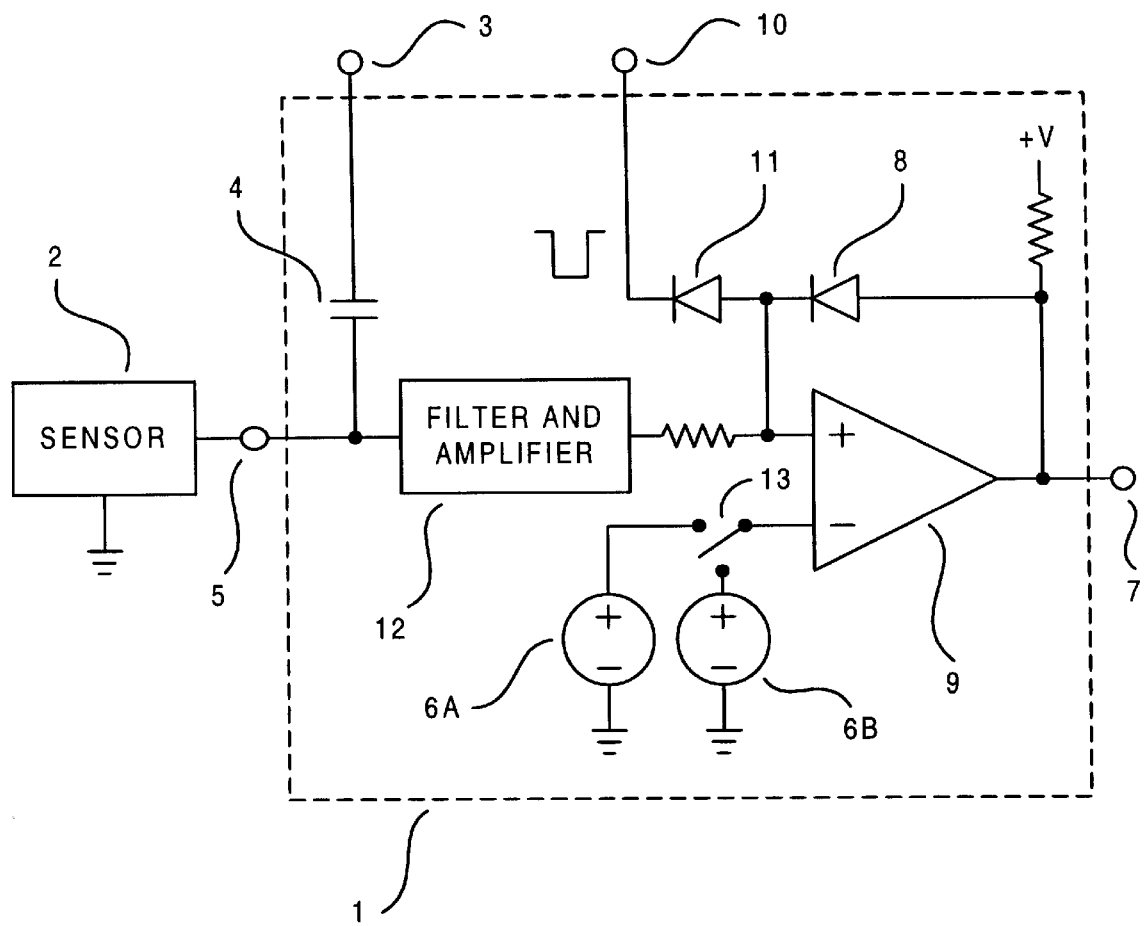
FIG. 1 illustrates a sensor connected to a sensor interface circuit of the present invention.

FIG. 1 shows a sensor interface circuit 1 used to detect the presence of a sensor 2 in a seed blockage monitoring system (not illustrated) of an agricultural planting equipment (not illustrated). In the depiction of FIG. 1, the sensor 2 represents any type of seed sensor having a capacitance which is detectable according to the method of the invention. As one of ordinary skill in the art would recognized, it is not necessary that the sensor 2 have a capacitance, as long as it has a reactance. At a time when it is desired to determine whether sensor 2 is connected to connection point 5, a detection signal is applied at terminal 3. The detection signal is thus applied through an impedance such as capacitor 4 to the connection point 5 of sensor interface circuit 1. In a preferred embodiment, the detection signal applied at terminal 3 is a voltage pulse. However any time-varying signal, such as a sinusoidal signal, could alternatively be applied.

The absence of the sensor 2 results in a predetermined voltage being applied to one input of a comparator 9. The peak amplitude of the predetermined voltage is designed to exceed the reference voltage 6A and thus to cause the comparator output at interface output 7 to transition to a high state. The presence of the capacitative reactance of the sensor 2 when connected to the connection point 5 reduces the peak amplitude of the voltage at the connection point 5, since the capacitance 4 and sensor 2 act as a voltage divider of the input signal to ground. This results in a reduced peak amplitude being applied to one input of the comparator 9. The reduced peak amplitude is designed to be lower than the reference voltage 6A. In this case, the comparator output at interface output 7 will not transition to a high state, as determined by sampling the interface output 7.

In a preferred embodiment, the comparator 9 employs a diode 8, arranged in a feedback loop as illustrated, to latch the high state of the comparator 9. This latching of the high state allows time for the interpretation of the interface output 7. A subsequent, active low clear signal applied to terminal 10 through the diode 11 forces the positive input to the comparator 9 low enough to drive the interface output 7 to a low state, thus clearing the latched state. An optional filter and amplifier 12 may be used to filter and adjust the amplitude of the voltage at the connection point 5 that is received by the comparator 9.

Because most failure modes of sensor 2 result in a loss of capacitative reactance of the sensor 2, the failure of sensor 2 will generally result in the interface output 7 transitioning to a high state when a detection signal is applied to the terminal 3. Thus, the comparator output being in a low state following a detection signal provides an indication that the sensor 2 is operable as well as connected to the connection point 5. By duplicating the sensor interface circuit 1 at each possible connection point of the seed monitor system, and then applying a detection signal to each sensor interface circuit, either simultaneously or sequentially, while monitoring each comparator output, one can readily determine which of all the possible connection points have sensors operably connected.

In a preferred embodiment, the sensor interface circuit 1 is capable of being used in both a normal operation mode and a sensor detect mode. By selecting a high impedance for capacitor 4, the parasitic effects of the sensor detection function on the normal operation of the sensor interface circuit 1 and sensor 2 is minimized. A single reference 6A can be used, or a switch 13 and a second reference voltage 6B can be added. In the sensor detect mode, switch 13 is set to input reference voltage 6A to the comparator 9. In the normal operation of the sensor interface circuit, switch 13 selects a second reference voltage 6B to input to the comparator 9. Switch 13 can be implemented by a mechanical switch or by two electronic switches that selectively connect one or the other of the reference voltages 6A or 6B to comparator 9.

The foregoing description is for illustration purposes only, it being intended that the scope of the invention be defined by the following claims and to include all additions and modifications thereto as would be obvious to one of ordinary skill in the art, e.g., operating with negative rather than positive logic.

What is claimed is:

1. A method of determining whether a sensor of a seed monitoring system is operably connected to an input of an interface circuit of the seed monitoring system, said sensor having an electrical reactance and a sensor terminal, said method comprising the following steps:

(a) connecting a first side of a known impedance via a first terminal to said input;

(b) applying a predetermined, time-varying voltage signal to a second side of said known impedance via a second terminal;

(c) determining whether the voltage at said first terminal is less than a predetermined voltage relative to a first reference voltage; and, (d) if said voltage is determined as being less than said predetermined voltage, inferring that said sensor terminal is connected to said input of the interface circuit.

2. The method of claim 1, wherein said sensor is a piezoelectric element which generates a voltage when struck by a seed.

3. The method of claim 1, wherein said seed monitoring system is a seed blockage monitor.

4. The method of claim 1, wherein said seed monitoring system is a seed counting monitor.

5. An interface circuit for a seed sensor comprising:

a connection point for said seed sensor;

a terminal for applying a sensor detection signal, said terminal being connected to said connection point via a reactive element; and, a comparator having positive and negative inputs, said positive input being in electrical communication with said connection point and said negative input being connectable to a first reference voltage source;

whereby, when the negative input of the comparator is connected to said first reference voltage source and a sensor detection signal is applied to said terminal, an output of said comparator is indicative of whether an operable seed sensor is connected to said connection point.

6. The interface circuit of claim 5, and further including:

a diode connected in a feedback loop of said comparator; and, another diode connected between a terminal for applying a clear signal and said positive input of said comparator.

7. The interface circuit of claim 5, in combination with a sensor attached to said interface circuit, wherein said sensor is a piezoelectric sensor which generates a voltage when struck by a seed.

8. The apparatus of claim 7, and further including a second reference voltage source selectively connectable to said negative input of said comparator so that, when the comparator is connected to said second reference voltage source, the output of said comparator is indicative of whether a seed has struck the sensor.

9. The interface circuit of claim 5, and further including a second reference voltage source selectively connectable to said negative input of said comparator so that, when a sensor is connected to said interface circuit and the comparator is connected to said second reference source, an output of said comparator is indicative of the sensor having sensed a seed.

10. An interface circuit for a seed sensor comprising:

circuit means having an output which, under a first operating condition, is indicative of an operable sensor connected to said circuit and, under a second operating condition, is indicative of a seed being sensed by an operable sensor connected to said circuit; and, switch means to selectively change the operating condition of said circuit means from said first operating condition to said second operating condition, or from said second operating condition to said first operating condition.

* * * * *